(12) United States Patent
Ormsbee

(10) Patent No.: US 11,943,380 B2
(45) Date of Patent: Mar. 26, 2024

(54) SYSTEMS AND METHODS FOR AN IMPROVED AND COMPATIBLE MAGNETIC MOUNT

(71) Applicant: Nite Ize, Inc., Boulder, CO (US)

(72) Inventor: Bowden Ormsbee, Longmont, CO (US)

(73) Assignee: Nite Ize, Inc., Boulder, CO (US)

(*) Notice: Subject to any disclaimer, the term of this patent is extended or adjusted under 35 U.S.C. 154(b) by 342 days.

(21) Appl. No.: 17/345,512

(22) Filed: Jun. 11, 2021

(65) Prior Publication Data
US 2022/0400170 A1 Dec. 15, 2022

(51) Int. Cl.
| | |
|---|---|
| H04M 1/11 | (2006.01) |
| H01F 7/02 | (2006.01) |
| H01R 13/62 | (2006.01) |
| H01R 24/20 | (2011.01) |
| B60R 11/00 | (2006.01) |
| B60R 11/02 | (2006.01) |

(52) U.S. Cl.
CPC .......... *H04M 1/11* (2013.01); *H01F 7/0252* (2013.01); *H01R 13/6205* (2013.01); *H01R 24/20* (2013.01); *B60R 2011/007* (2013.01); *B60R 11/0241* (2013.01)

(58) Field of Classification Search
CPC ......... H04M 1/11; H04M 1/04; H01F 7/0252; H01R 13/6205; H01R 24/20; B60R 11/0241; B60R 2011/007; B60R 2011/0089
See application file for complete search history.

(56) References Cited

U.S. PATENT DOCUMENTS

| | | |
|---|---|---|
| 10,703,297 B1 | 7/2020 | Cohen et al. |
| 2014/0224947 A1 | 8/2014 | Barnard et al. |
| 2016/0318455 A1 | 11/2016 | Zhang et al. |
| 2017/0345536 A1 | 11/2017 | Breiwa et al. |
| 2018/0259119 A1 | 9/2018 | Zhu |
| 2019/0185094 A1 | 6/2019 | Vogel et al. |

OTHER PUBLICATIONS

International Search Report and Written Opinion dated Aug. 18, 2022 issued in related PCT App. No. PCT/US2022/072741 (8 pages).

*Primary Examiner* — Tuan D Nguyen
(74) *Attorney, Agent, or Firm* — Haynes and Boone, LLP

(57) ABSTRACT

A system for mounting an electronic device includes a socket and a stand, the stand having a ball portion. The socket and the ball portion include first magnetic material to hold the socket and the ball portion together in a position selected by a user, the socket further including a magnetic array, the magnetic array having magnetism to hold an electronic device to the socket. In one alternative, the first magnetic material is separate from the magnetic array.

20 Claims, 12 Drawing Sheets

SYSTEMS AND METHODS FOR AN IMPROVED AND COMPATIBLE MAGNETIC MOUNT

BACKGROUND

Users of mobile devices desire to mount and hold these devices in various positions and configurations. Typically, a holder or attachment to the back of the device is used for mounting the device. Some newer devices include adaptations for ready attachment, therefore making it easier to use mounting and holding devices.

BRIEF SUMMARY

In one embodiment, a system for mounting an electronic device includes a socket and a stand, the stand having a ball portion. The socket and the ball portion include first magnetic material to hold the socket and the ball portion together in a position selected by a user, the socket further including a magnetic array, the magnetic array having magnetism to hold an electronic device to the socket. In one alternative, the first magnetic material is separate from the magnetic array. In another alternative, the first magnetic material includes a socket magnet in the socket. Alternatively, the first magnetic material includes magnetizable material forming at least a portion of the ball portion. In another alternative, the socket magnet is a permanent magnet. Alternatively, the first magnetic material includes a magnetizable piece and the magnetic array provides magnetism to the magnetizable piece. In another alternative, the magnetic array includes a plurality of magnets arranged in a circle. Alternatively, the first magnetic material includes a socket magnet in the socket and a piece of high friction material located in the center of the socket magnet. In another alternative, the socket includes a first side and a second side and the socket magnet is located on the first side. In another alternative, the magnetic array is located on the second side. Alternatively, the magnetic array is cover by a pad and the electronic device is located on the pad when held. In another alternative, the system further includes a magnetizable ring, the magnetizable ring attached to the electronic device. Alternatively, the magnetizable ring is attached to the electronic device via adhesive and the electronic device is a smartphone. In another alternative, the magnetizable ring does not interfere with inductance charging of the smartphone.

In one embodiment, a system for mounting an electronic device, the electronic device selected from a group consisting of a smart phone or a tablet includes a socket having a shell, a magnetic array arranged in a circle, and a socket magnet. The system further incudes a stand, the stand having a ball portion, the ball portion composed of magnetic material. The magnetic attraction between ball portion and the socket magnet hold the stand and the socket together in a position on the ball portion selected by a user and the magnetic array having magnetism to hold an electronic device to the socket. Alternatively, a piece of high friction material located in the center of the socket magnet and a pad covers the magnetic array, the electronic device resting on the pad when the magnetic array holds the electronic device. In one alternative, the system further includes a magnetizable ring, the magnetizable ring located on the electronic device, the magnetic array attracting the magnetizable ring to hold the electronic device. Alternatively, the electronic device includes a magnetizable ring corresponding to the magnetic array both cooperating to hold the electronic device to the socket.

In one embodiment, a method of holding an electronic device, includes providing a mount, the mount including: a socket having a shell, a magnetic array arranged in a circle, and a socket magnet; a stand, the stand having a ball portion, the ball portion composed of magnetic material. The magnetic attraction between ball portion and the socket magnet holds the stand and the socket together in a position on the ball portion selected by a user and the magnetic array having magnetism to hold an electronic device to the socket. The method further includes placing the electronic device proximate to the magnetic array and holding the electronic device with the magnetic array. The method further includes placing the socket magnet on the ball and holding the socket to the stand. The method further includes positioning the electronic device in a desired position and holding it in place with the mount. Alternatively, a magnetizable ring is attached to the electronic device and the magnetic array attaches to the magnetizable ring.

DETAILED DESCRIPTION

Certain terminology is used herein for convenience only and is not to be taken as a limitation on the embodiments of the systems and methods for an improved and compatible magnetic mount. In many embodiments, the device includes a first and second magnetic interconnection system, the first magnetic system for attaching to a ball mount and the second magnetic system for attaching to the mobile device (which in most cases is a mobile phone but may also include a tablet or any other item whose weight and size is such that the magnetism of the mount is sufficient to hold it in place.

Figure 1:
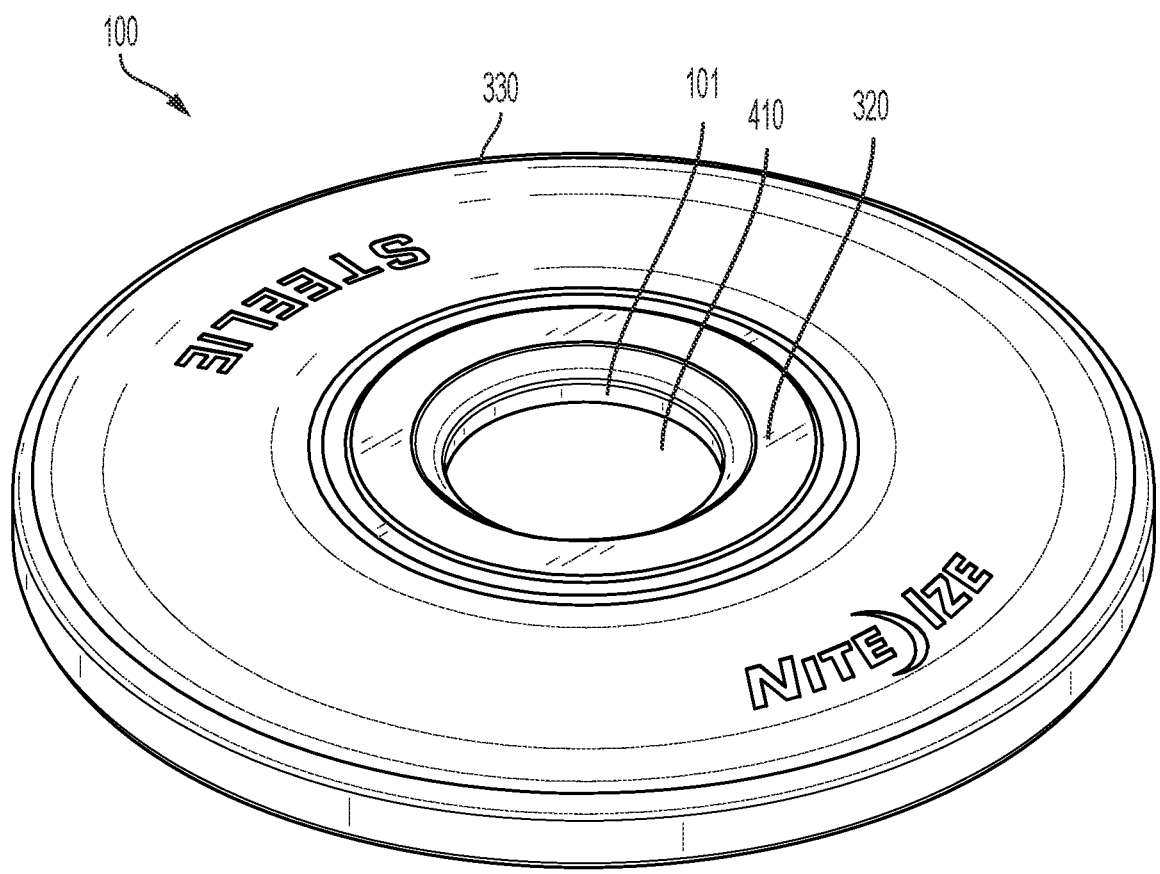
FIG. 1 shows one embodiment of a magnetic socket, including an array attachment mechanism.
Figure 14:
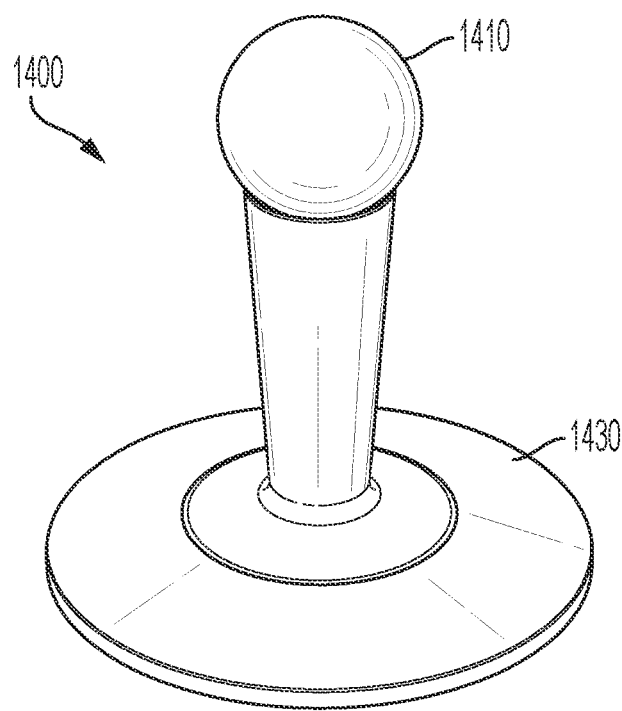
FIG. 14 shows one embodiment of a stand for use with the magnetic socket of FIG. 1.

FIG. 1 shows one embodiment of a magnetic socket 100. In FIG. 1, the indentation 101 in the center of shell 330 includes a piece of high friction material 410 in the center of the indentation. High friction material 410 may have an adhesive back, such that it can stick in socket magnet 320. The high friction material may be a variety of materials, including but not limited, high friction elastomeric material, rubber, metal, composite material, plastics, silicone, and wood. The indentation 101 is part of socket magnet 320. Socket magnet 320 is shaped to have a complementary shape to a ball to which it may be interconnected. Magnetic socket 100 is attachable to a mount including a ball portion as shown in FIG. 14.

Figure 2:
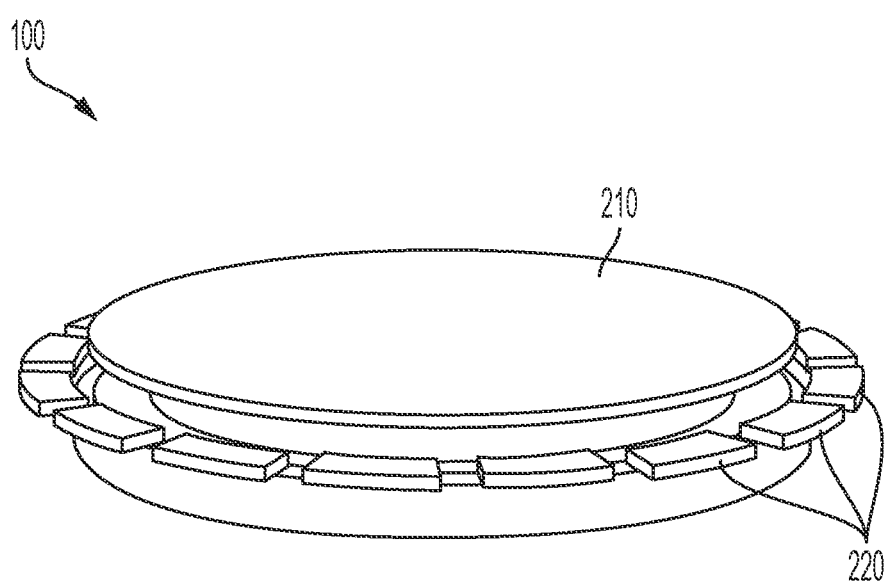
FIG. 2 shows another view of the magnetic socket of FIG. 1.

FIG. 2 shows another view of magnetic socket 100. In this view magnetic socket 100 has the shell 330 removed. Visible in this view is pad 210 which fits on the backside of magnetic socket 100. Pad 210 may be made up of multiple layers including, but not limited to, a friction layer and an adhesive layer. Additionally, visible is magnetic array 220. This magnetic array 220 is specifically designed to attach to the mate with the MagSafe® magnets in new mobile phone designs, such as the I-phone®. These MagSafe magnets arrays are arranged in a circular fashion inside the phone that matches the magnetic array 220. These arrangements inside the phone may be according to MagSafe® standards, or may take on alternative forms, but importantly, they provide magnetizable material that approximately and at least partially matches the arrangement of magnetic array 220. Essentially, in many configurations, either magnets or magnetizable material may be oriented in a circular fashion and located in the electronic device. In many embodiments, these magnets are a plurality of individual magnets arranged in a circular fashion.

Figure 3:
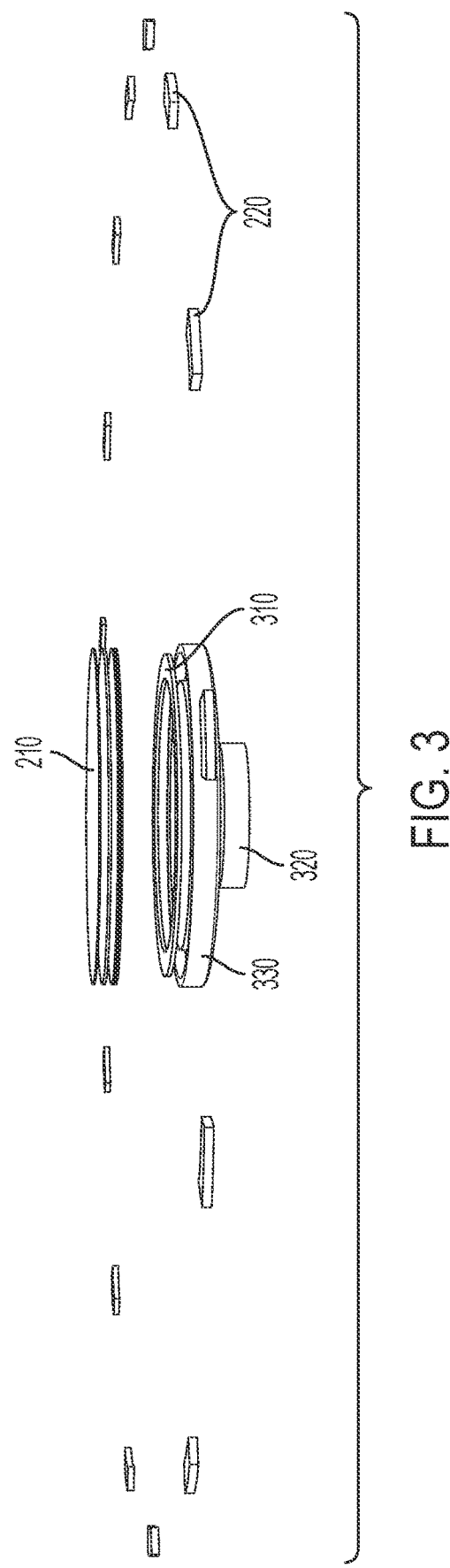
FIG. 3 shows a further expanded view of the magnetic socket of FIG. 1.

FIG. 3 shows a further expanded view of magnetic socket 100. In this view the magnetic array 220 has been further expanded. Additionally, an adhesive ring 310 is shown, providing for attachment of the magnetic array to the body/housing 330. Socket magnet 320 is also shown, which provides for interconnection to a ball mount.

Figure 4:
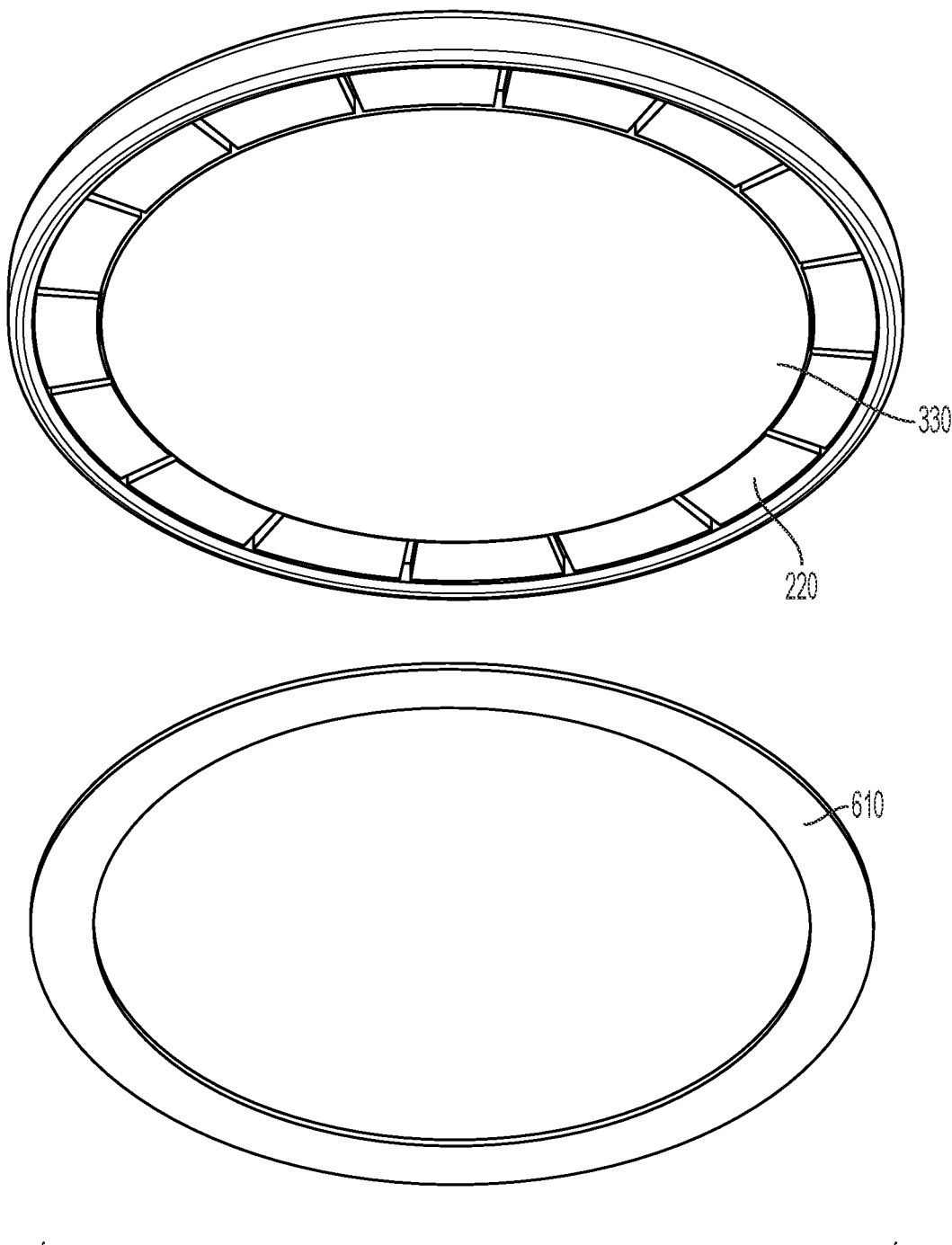
FIG. 4 shows another view of the magnetic socket of FIG. 1.

FIG. 4 shows another view of magnetic socket 100. In this view it is visible how magnetic array is fit into shell 330. Pad 210 has been removed in this view.

Figure 5:
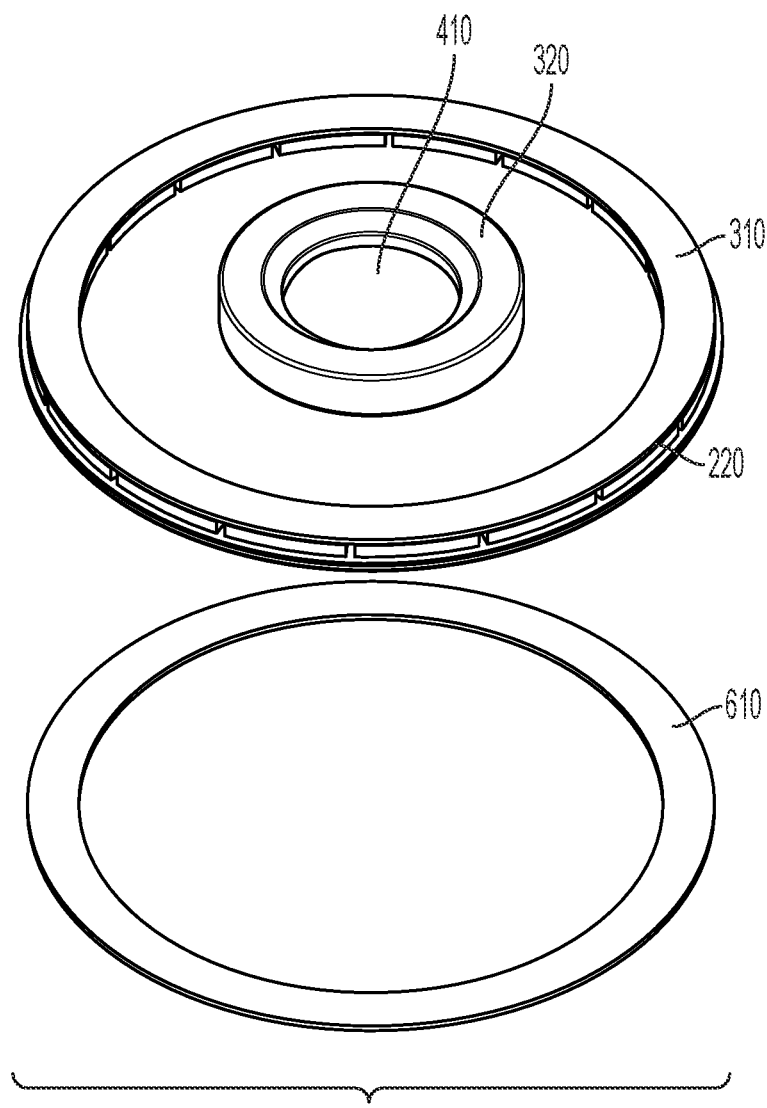
FIG. 5 shows a view of the magnetic socket of FIG. 1 with the shell removed.

FIG. 5 shows a view of magnetic socket 100 with the shell 330 removed. Here socket 320 is visible as is high friction material 410. Adhesive ring 310 is shown as it sits on top of magnetic array 220 to attach it to the shell 330. Additionally, a retrofit ring 610 is shown. Retrofit ring 610 is described in further detail below.

Figure 6:
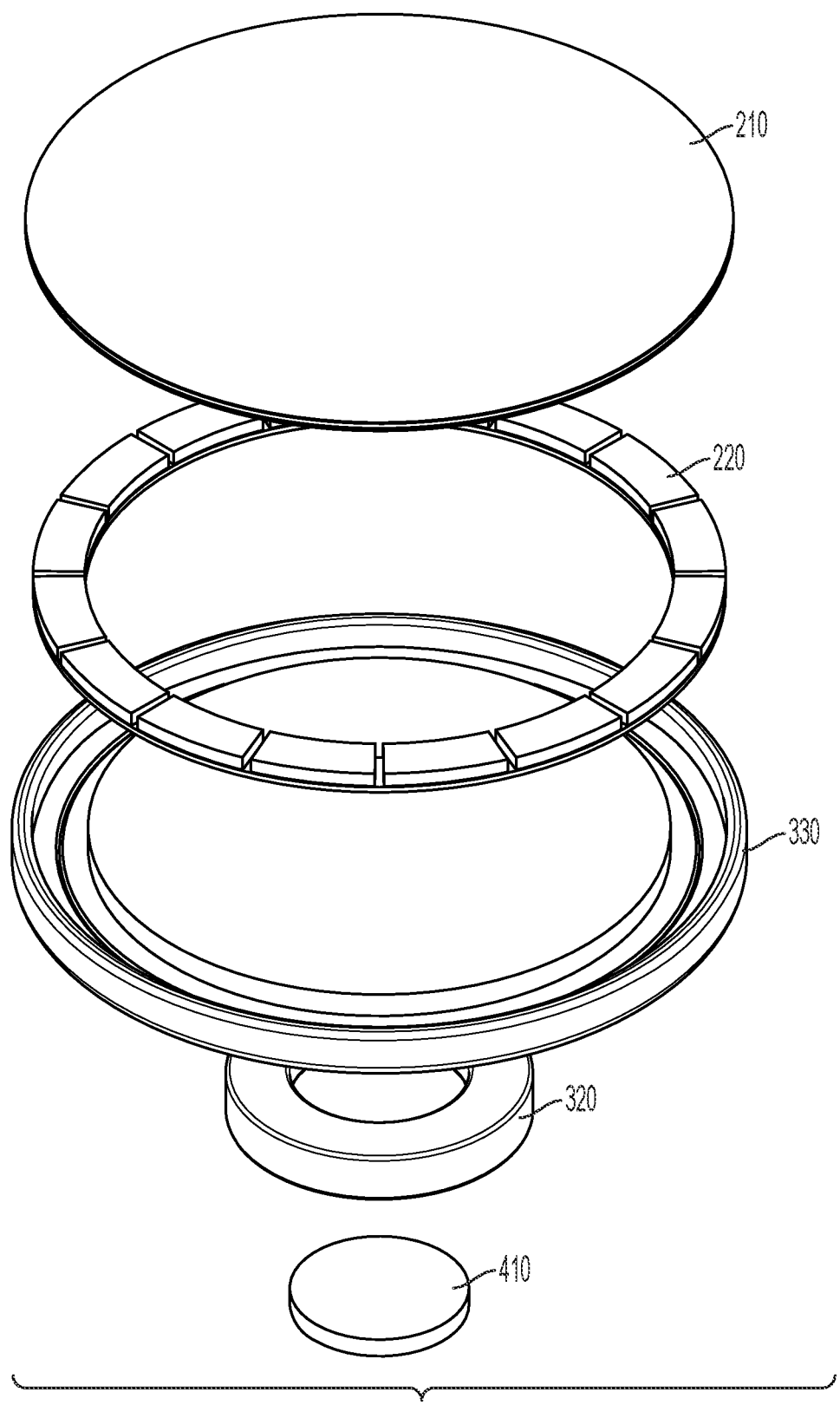
FIG. 6 shows a vertically exploded view of the magnetic socket of FIG. 1.

FIG. 6 shows a vertically exploded view of magnetic socket 100. From the top of the figure down, pad 210 is shown, which sits on top of magnetic array 220. Magnetic array 220 fits into shell 330 and is held in place via adhesive ring 310. Additionally, magnetic socket includes socket magnet 320 and high friction material 410 inside of the socket magnet 320. In many embodiments, shell 330 is made of plastic. Alternatively, shell 330 may be made of plastic, metal, wood, composite, or other material. However, if shell 330 is made of magnetizable material, unexpected effects may occur related to how the device attached. Typically, pad 210 is made of a friction enhancing material, such as silicone, rubber, or other high friction composite or other material. Pad 210 may be made of a variety of materials however, including plastic, wood, or other material, however, if it made of magnetizable material, unexpected effects may occur related to how the device attached. Various methods may be used to attach the various parts of the device, including, but not limited to: adhesive, heat welding, or attachment devices like screws and bolts, however, attachment devices are generally less preferred. Socket magnet 320 is generally a neodymium magnet, however, various magnets may be used. In alternatives, socket magnet 320 need not be socket shaped and may be ring or disc shaped or may be many other shapes. In the case of it not being socket shaped, an adapter piece may be included and fitted over, on, or with the magnet to increase contact with a ball when the device is mated with a ball.

Figure 7:
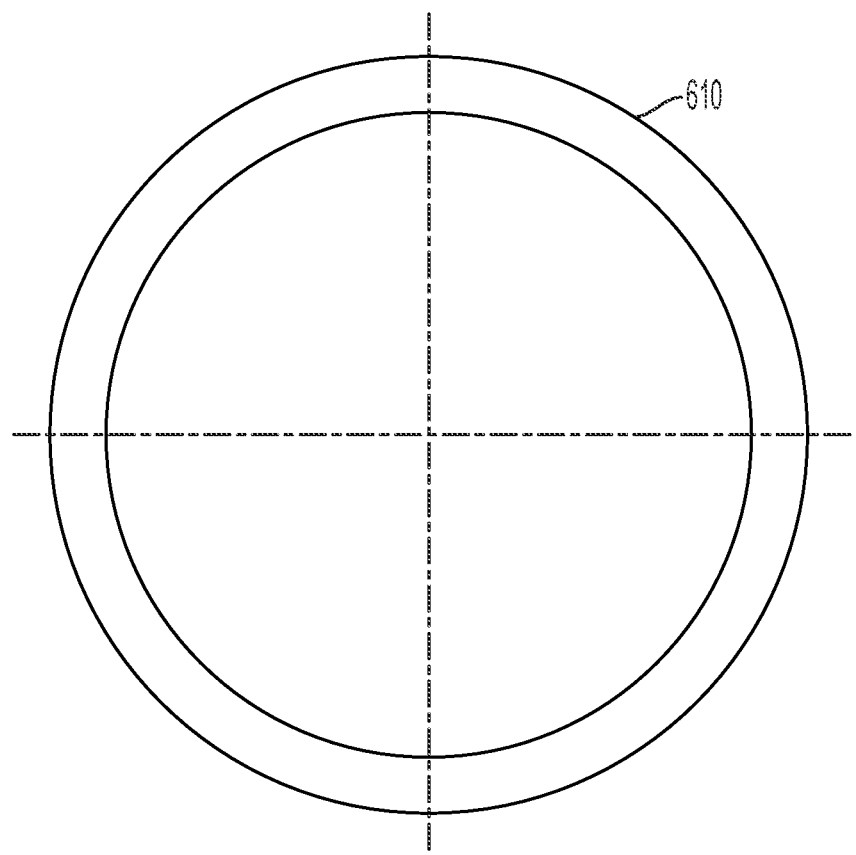
FIG. 7 shows a retrofit device for smartphones and electronic devices that do not include a MagSafe array or other internal attachment device.

FIG. 7 shows a retrofit device for smartphones and electronic devices that do not include a MagSafe® array or other internal attachment device. Additionally, this device allows for inductance charging as the ring does not interfere with the inductance charging mechanism. FIG. 7 shows ring 610. Ring 610 includes an adhesive layer on one side, such that it may be attached to the back of a device. In this scenario, the array 220 may magnetize to ring 610 and therefore hold the device in place.

Figure 8:
FIG. 8 shows a right-side view of the magnetic socket of FIG. 1.
Figure 9:
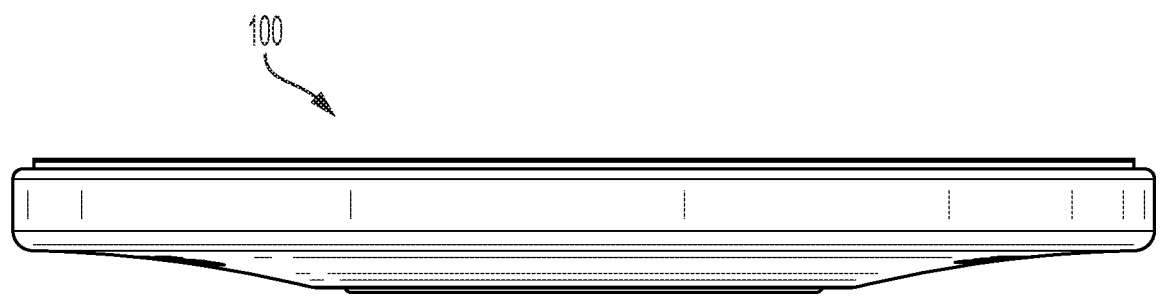
FIG. 9 shows a left-side view of the magnetic socket of FIG. 1.
Figure 10:
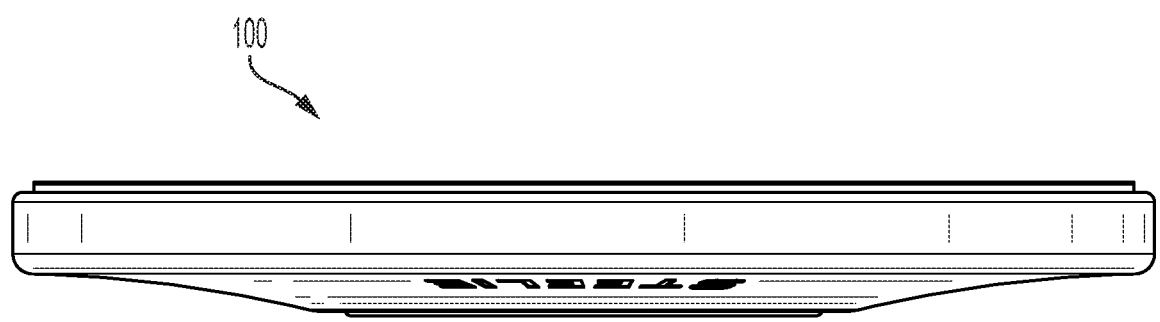
FIG. 10 shows a front view of the magnetic socket of FIG. 1.
Figure 11:
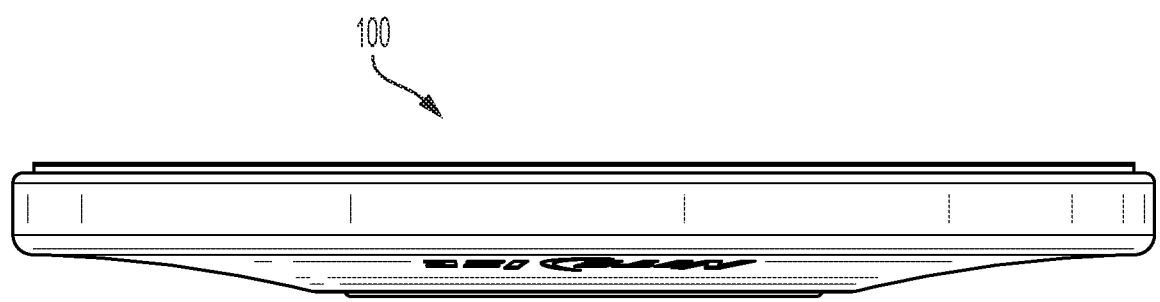
FIG. 11 shows a rear view of the magnetic socket of FIG. 1.
Figure 12:
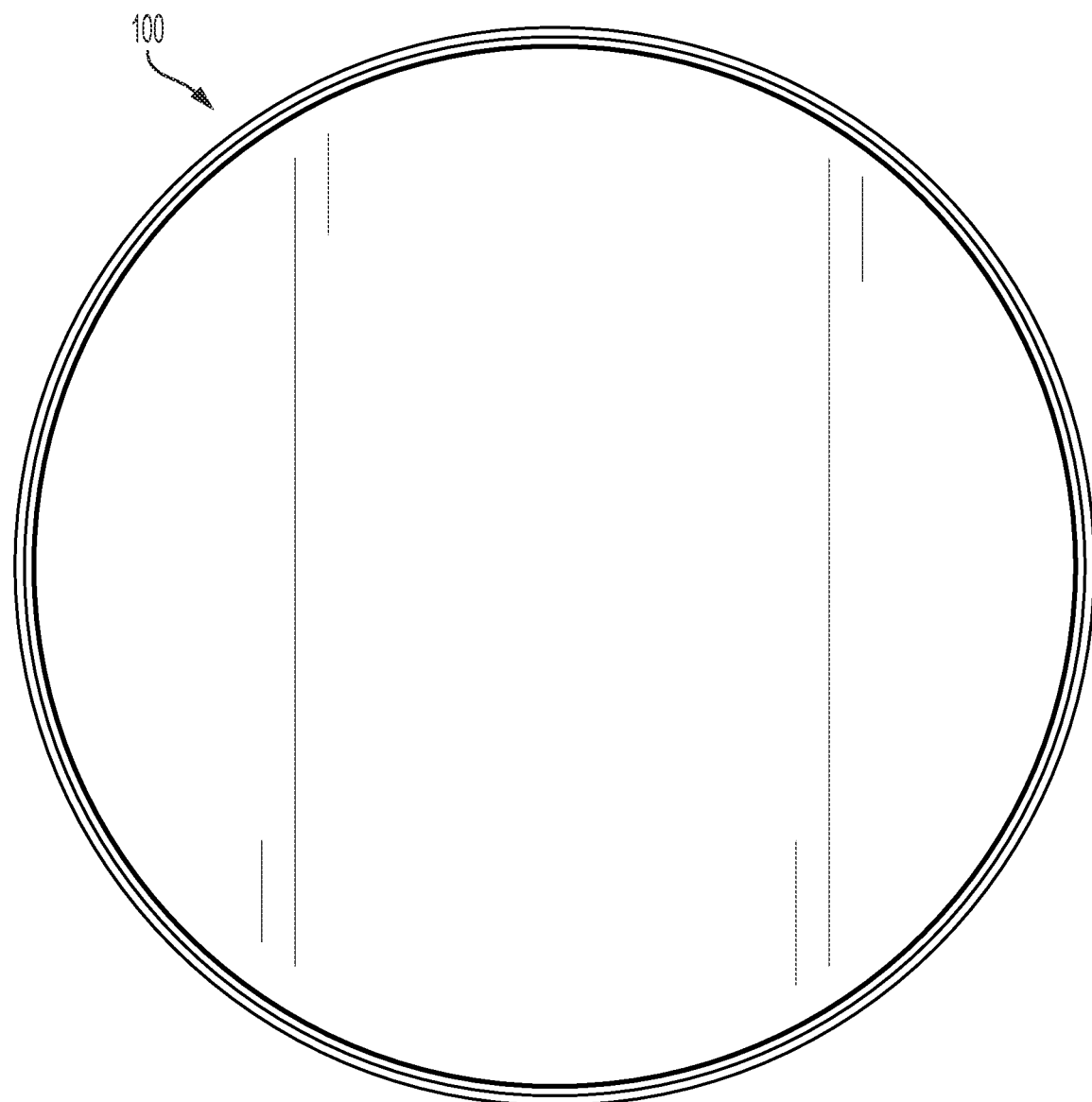
FIG. 12 shows a bottom view of the magnetic socket of FIG. 1.
Figure 13:
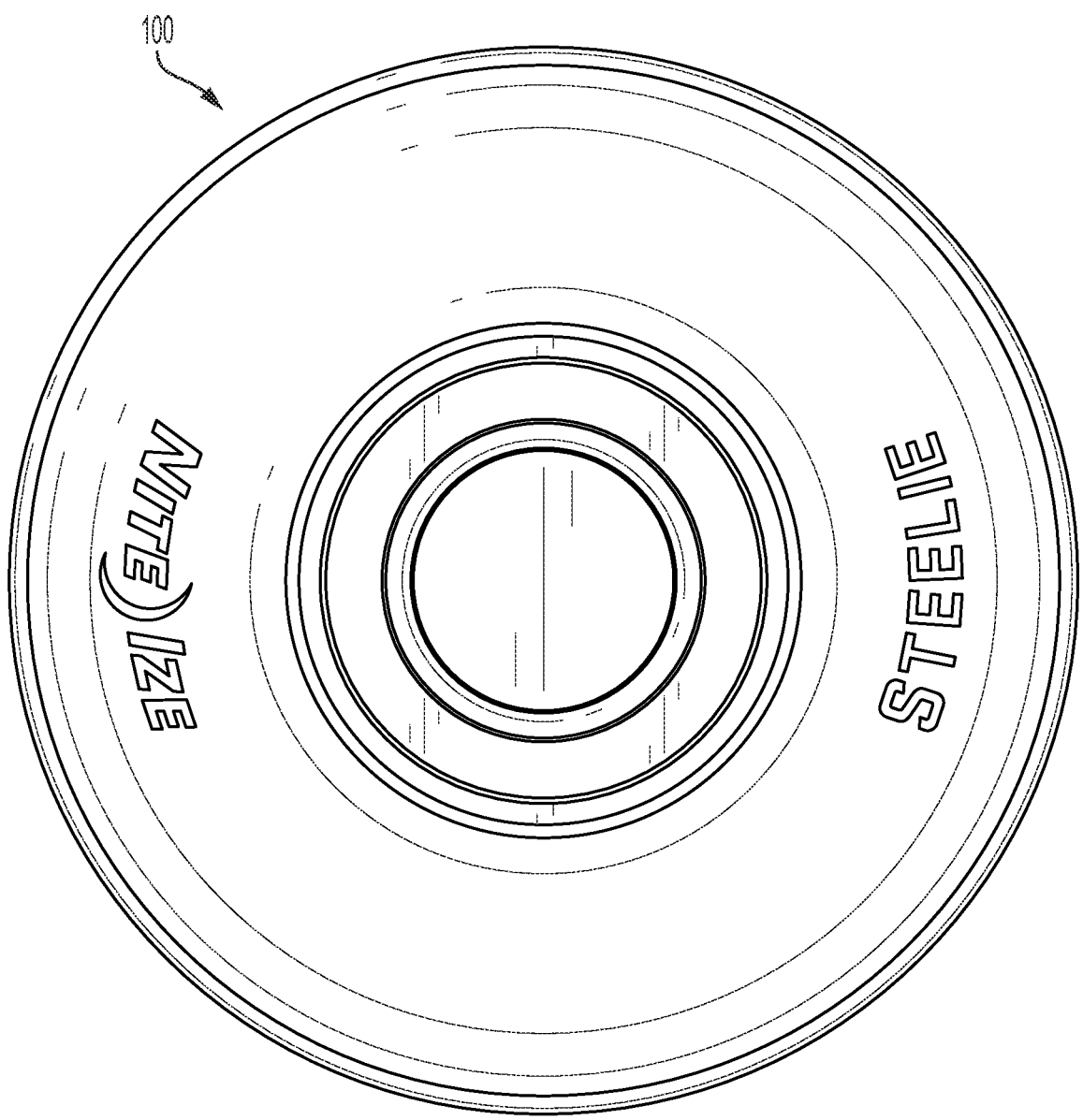
FIG. 13 shows a top view of the magnetic socket of FIG. 1.
Figure 15:
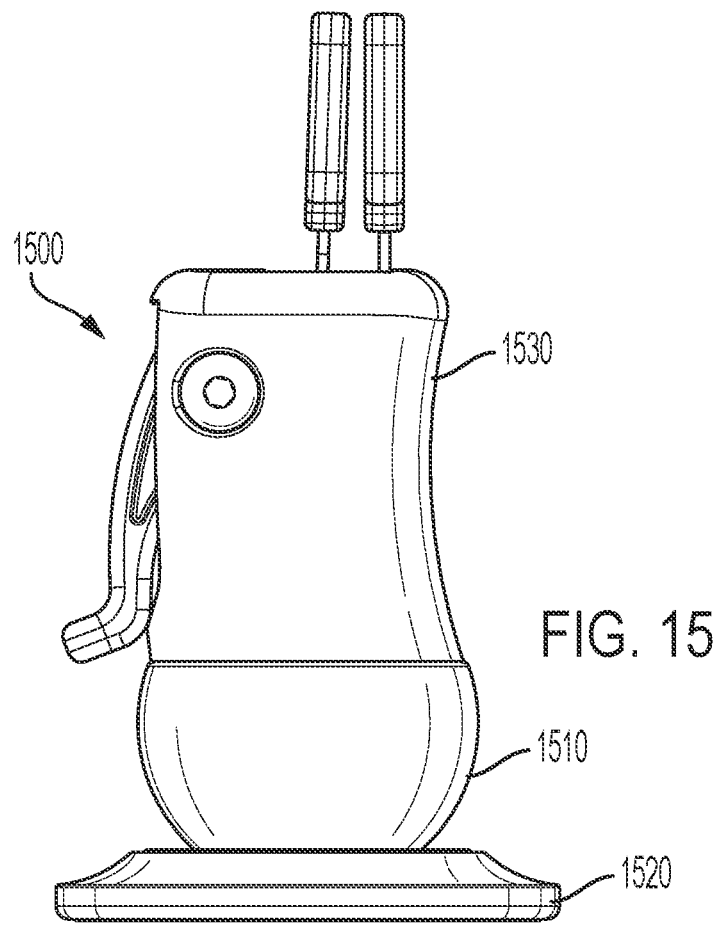
FIG. 15 shows another example of a stand magnetic socket of FIG. 1.

FIG. 8 shows a right-side view of the magnetic socket 100. FIG. 9 shows a left-side view of the magnetic socket 100. FIG. 10 shows a front view of the magnetic socket 100. FIG. 11 shows a rear view of the magnetic socket 100. FIG. 12 shows a bottom view of the magnetic socket 100. FIG. 13 shows a top view of the magnetic socket 100. FIG. 14 shows one embodiment of a stand 1400 including a ball portion 1410 and a base portion 1420. Magnetic socket 100 is designed to mate with ball portion 1410 at socket magnet 320. High friction material 410 adds friction to prevent ball portion 1410 from slipping in relation to socket magnet 320. In many different configurations, base portion 1420 may take on various shapes and configurations. Typically, the base is of a flat bottom design so that it may stand on a table or be mounted on a dash. Typically, the underside of the base includes adhesive. Additionally, the based may be shrunk to a lesser height. In alternatives, the base portion 1420 may include a suction cup, another magnet, a gripping device, a vent mounting device, another mechanically positionable arm, a device that fits into the charging port of a car, or a wide variety of other shapes and devices. Additionally, the ball portion 1410 may take on a variety of shapes including any portion of a sphere and may be larger or smaller, however, generally it is desirable that it fit with socket magnet 320. FIG. 15 shows another example of a stand 1500 that is designed to attach to a vent. The stand 1500 includes a ball section 1510 that is attached to an embodiment of a magnetic socket 1520 according to the described magnetic array. The stand 1500 includes a clamping end 1530, specifically configured to attach to the vent of a vehicle. The stands depicted are only a fraction of the possible stands as indicated above.

In many embodiments, the magnetic socket provides for a mobile device to be positioned in a wide variety of positions. Essentially, the socket may be positioned on any point of the ball portion and the magnetism and the friction between the socket, the high friction material, and the ball will cause the device to hold its position. In alternatives, the ball and the socket may both be permanent magnets. In some alternatives, the ball is a permanent magnet and the socket is magnetizable material. In many alternatives, the socket is a permanent magnet and the ball is magnetizable material. In some alternatives, the magnetic array provides magnetism to the socket, with the socket made of magnetizable material and the ball made of magnetizable material.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A system for mounting an electronic device comprising:
   a socket;
   a stand, the stand having a ball portion;
   wherein the socket and the ball portion include first magnetic material to hold the socket and the ball portion together in a position selected by a user, the socket further including a magnetic array, the magnetic array having magnetism to hold an electronic device to the socket, the magnetic array in a body portion of the socket.

2. The system of claim 1, wherein the first magnetic material is separate from the magnetic array.

3. The system of claim 2, wherein the first magnetic material includes a socket magnet in the socket.

4. The system of claim 3, wherein the first magnetic material includes magnetizable material forming at least a portion of the ball portion.

5. The system of claim 4, wherein the socket magnet is a permanent magnet.

6. The system of claim 1, wherein the first magnetic material includes a magnetizable piece and the magnetic array provides magnetism to the magnetizable piece.

7. The system of claim 1, wherein the magnetic array includes a plurality of magnets arranged in a circle.

8. The system of claim 7, wherein the first magnetic material includes a socket magnet in the socket and a piece of high friction material located in the center of the socket magnet.

9. The system of claim 8, wherein the socket includes a first side and a second side and the socket magnet is located on the first side.

10. The system of claim 9, wherein the magnetic array is located on the second side.

11. The system of claim 10, wherein the magnetic array is cover by a pad and the electronic device is located on the pad when held.

12. The system of claim 11, further comprising, a magnetizable ring, the magnetizable ring attached to the electronic device.

13. The system of claim 12, wherein the magnetizable ring is attached to the electronic device via adhesive and the electronic device is a smartphone.

14. The system of claim 13, wherein the magnetizable ring does not interfere with inductance charging of the smartphone.

15. A system for mounting an electronic device, the electronic device selected from a group consisting of a smart phone or a tablet, the system comprising:
   a socket having a shell, a magnetic array arranged in a circle, and a socket magnet, the magnetic array in the shell;
   a stand, the stand having a ball portion, the ball portion composed of magnetic material;
   wherein magnetic attraction between ball portion and the socket magnet hold the stand and the socket together in a position on the ball portion selected by a user and the magnetic array having magnetism to hold an electronic device to the socket.

16. The system of claim 15, wherein a piece of high friction material located in the center of the socket magnet and a pad covers the magnetic array, the electronic device resting on the pad when the magnetic array holds the electronic device.

17. The system of claim 16, further comprising: a magnetizable ring, the magnetizable ring located on the electronic device, the magnetic array attracting the magnetizable ring to hold the electronic device.

18. The system of claim 16, wherein the electronic device includes a magnetizable ring corresponding to the magnetic array both cooperating to hold the electronic device to the socket.

19. A method of holding an electronic device, the method comprising:
   providing a mount, the mount including:
      a socket having a shell, a magnetic array arranged in a circle, and a socket magnet;
      a stand, the stand having a ball portion, the ball portion composed of magnetic material;
      wherein magnetic attraction between ball portion and the socket magnet hold the stand and the socket together in a position on the ball portion selected by a user and the magnetic array having magnetism to hold an electronic device to the socket;
   placing the electronic device proximate to the magnetic array and holding the electronic device with the magnetic array;
   placing the socket magnet on the ball and holding the socket to the stand;
   positioning the electronic device in a desired position and holding it in place with the mount.

20. The method of claim 19, wherein a magnetizable ring is attached to the electronic device and the magnetic array attaches to the magnetizable ring.

* * * * *